Oct. 20, 1964   C. F. QUIRMBACH, JR   3,153,346
ACCELEROMETER
Filed March 8, 1960   2 Sheets-Sheet 1
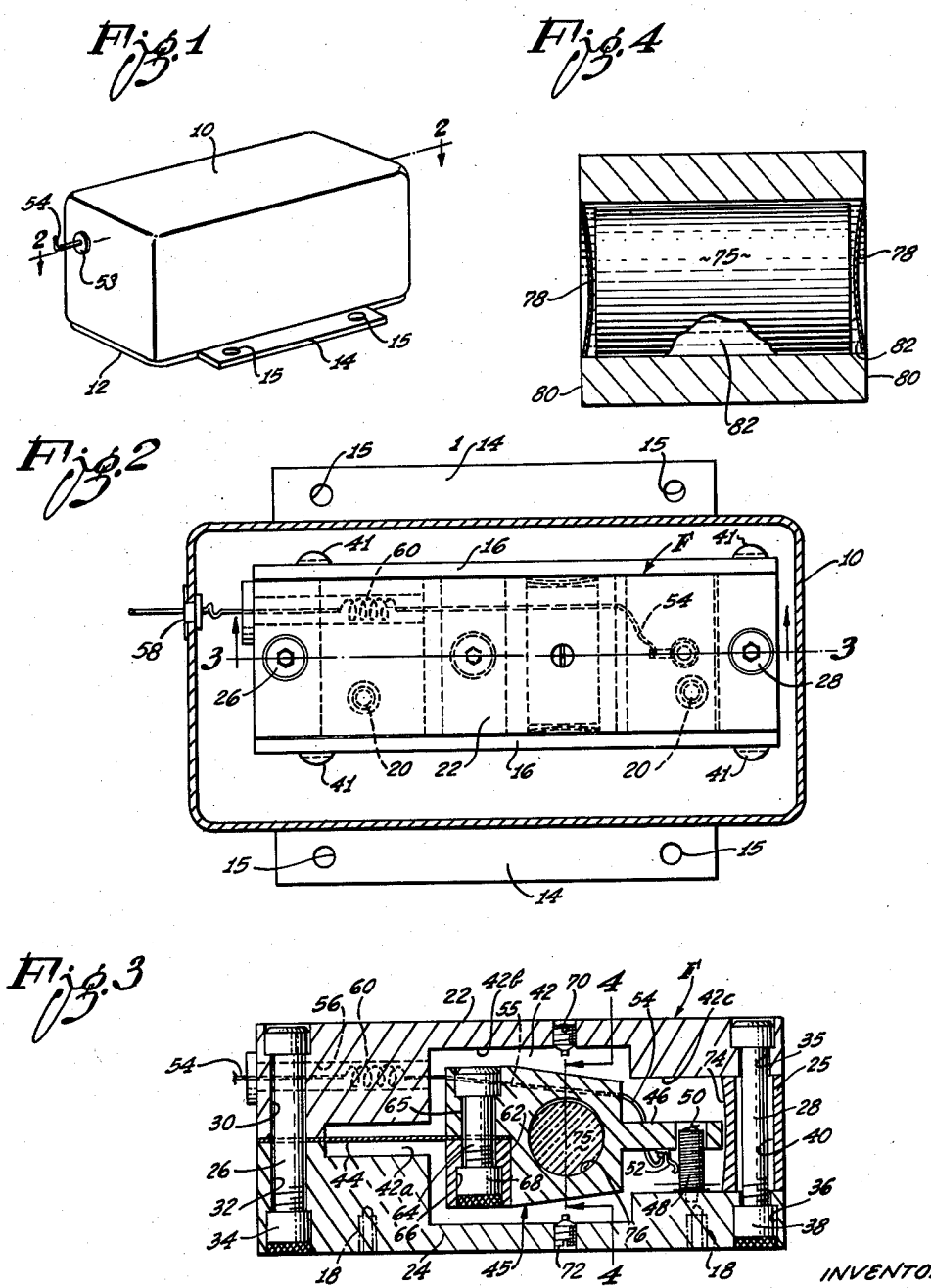
INVENTOR.
Charles F. Quirmbach, Jr.
Attorneys.

Oct. 20, 1964 C. F. QUIRMBACH, JR 3,153,346
ACCELEROMETER
Filed March 8, 1960 2 Sheets-Sheet 2

INVENTOR:
Charles F. Quirmbach, Jr.

Attorneys.

United States Patent Office 3,153,346
Patented Oct. 20, 1964

3,153,346
ACCELEROMETER
Charles F. Quirmbach, Jr., Northridge, Calif., assignor to Genisco, Incorporated, Los Angeles, Calif., a corporation of California
Filed Mar. 8, 1960, Ser. No. 13,618
9 Claims. (Cl. 73—497)

This invention relates to accelerometers, for example, accelerometers for sensing the acceleration of aircraft and missiles and, more particularly, refers to such an accelerometer in which the movements of the sensing mass are damped by a gaseous fluid such as air.

A liquid, such as a suitable oil, is commonly used in an accelerometer for damping the sensing mass, but certain difficulties and disadvantages are inherent in the use of a liquid and these disadvantages may be avoided by using a gaseous damping fluid. The one disadvantage of a gaseous fluid is its compressibility. This disadvantage, however, may be minimized to a desired degree simply by using a body of gas of relatively low volume arranged to provide a relatively large area for damping response.

The object of the present invention is to provide a simple, compact, durable and highly efficient instrument for sensing low frequency accelerations, which instrument employs a gaseous damping fluid with the required high ratio of responsive area to volume.

The obvious arrangement for achieving this object would be to use a large diameter piston or diaphragm across a large diameter cylinder or chamber of very shallow depth with the movable sensing mass operatively connected to the piston or diaphragm. In such an arrangement, however, the additional damping structure greatly increases the bulk and weight of the instrument, adds moving parts to the mechanism and, in effect, imposes a weight on the sensing mass. In addition, the use of a piston involves additional frictional resistance, and the use of a diaphragm involves additional flexural resistance.

The present invention avoids all of these disadvantages by arranging for the sensing mass and its resilient suspension to serve in effect as a piston for damping displacement of the gaseous fluid. The initial embodiment of the invention employs a sensing mass mounted on a leaf spring with one end of the leaf spring fixed, and this whole assembly serves as a piston. The leaf spring confines the responsive movement of the sensing assembly to a plane through the sensing axis of the accelerometer, and the accelerometer housing forms a damping chamber having two opposite parallel side walls closely adjacent the two opposite sides of the sensing assembly.

The arrangement adds no structure whatever for the damping action. No additional piston or diaphragm is required, and no added damping cylinder or chamber is necessary. In fact, the invention even eliminates the necessity for an added damping orifice since the leaf spring, in effect, cooperates with the adjacent housing walls to form an elongated orifice for displacement flow of the gaseous fluid.

If desired, the surfaces of the sensing mass may be spaced substantially from the corresponding parallel walls of the chamber so that all of the displacement flow occurs around the relatively thin edges of the leaf spring. In the initial embodiment of the invention, however, the sensing mass has surfaces closely adjacent the chamber walls and parallel with the chamber walls, these surfaces being of extensive dimension in the direction of flexure of the leaf spring. The resulting extensive clearance areas afford much greater resistance to displacement flow of the gaseous fluid than the thin edges of the leaf spring and thus serve effectively to divert the displacement flow of the gaseous fluid away from the sensing mass to the edges of the leaf spring.

In a damping arrangement employing a gaseous fluid, the area of the orifice through which displacement flow occurs must be restricted to produce the desired damping effect. If the whole extent of the sides and free edges of the sensing assembly is utilized to form an elongated U-shaped orifice having one thin edge, the total area of the orifice may be much too large. The use of relatively wide surfaces of the sensing mass along a substantial portion of this U-shaped orifice reduces the effective area of the thin-edged orifice to the desired degree by diverting the displacement flow of the gaseous damping fluid away from the portions of the U-shaped orifice that are defined by the sensing mass itself.

In carrying out this concept, it has been found that a new problem arises when such a gas-damped accelerometer is designed for sensing low frequency accelerations and is used in an environment that imposes high frequency accelerations on the instrument. At some critical high frequency range, the sensing assembly tends to respond with a wavelike motion of the leaf spring. Since this undulating motion causes little, if any, change in the relative volumes of the chamber compartments on the opposite sides of the sensing assembly, no damping displacement flow of the gaseous fluid occurs. In the absence of damping restraint, the uncontrolled high frequency responses may quickly destroy the sensing assembly.

The invention meets this difficulty by mounting a smaller auxiliary mass on the sensing assembly with freedom for the auxiliary mass to oscillate relative to the sensing mass. When the critical high frequency acceleration range is entered the smaller auxiliary mass absorbs the high frequency energy by vibrating relative to the sensing mass, the sensing mass being thus made immune to the destructive high frequency forces.

An important feature of the invention is the manner in which it provides automatic compensation for increasing viscosity of the gaseous damping fluid with increasing temperature. The compensation is provided by decreasingly restricting the displacement flow in accord with rising temperature. Such variable restriction of the displacement flow is usually accomplished by a valve member under the control of a bimetallic element. In the present invention, the desired compensation is effected by decreasing the clearance between the side edges of the leaf spring and the adjacent parallel walls of the chamber. For this purpose, the material selected for the leaf spring has a smaller coefficient of thermal expansion than the metal of the housing that forms the chamber in which the leaf spring is enclosed. For example, the leaf spring may be made of a metal such as the alloy sold under the trademark Nispan-C with the chamber made of steel; or a leaf spring made of beryllium copper may be used in a chamber made of aluminum.

A further advantage of the described arrangement is that the free end of the sensing assembly may be extended substantially beyond the center of gravity of the sensing mass, and the pickup means or signalling means of the accelerometer may be operated by this free end. Since the free end of the sensing assembly functions over a much larger distance than the sensing mass, this arrangement has an amplifying effect on the signals.

A still further feature of the preferred practice of the invention is an economical but highly accurate method of fabricating the accelerometer. As will be explained, this method involves the use of accurate shims to determine the clearance between chamber walls and the sides of the sensing assembly.

The features and advantages of the invention may be understood by reference to the following detailed description and the accompanying drawings.

In the drawings, which are to be regarded as merely illustrative:

FIG. 1 is a perspective view of the selected embodiment of the invention;

FIG. 2 is a transverse horizontal section taken as indicated by the line 2—2 of FIG. 1;

FIG. 3 is a longitudinal section of the inner chamber taken as indicated by the line 3—3 of FIG. 2;

FIG. 4 is a fragmental transverse vertical section of the sensing mass taken as indicated by the line 4—4 of FIG. 3 to show how the auxiliary mass is mounted in a transverse bore in the sensing mass.

Figure 5:
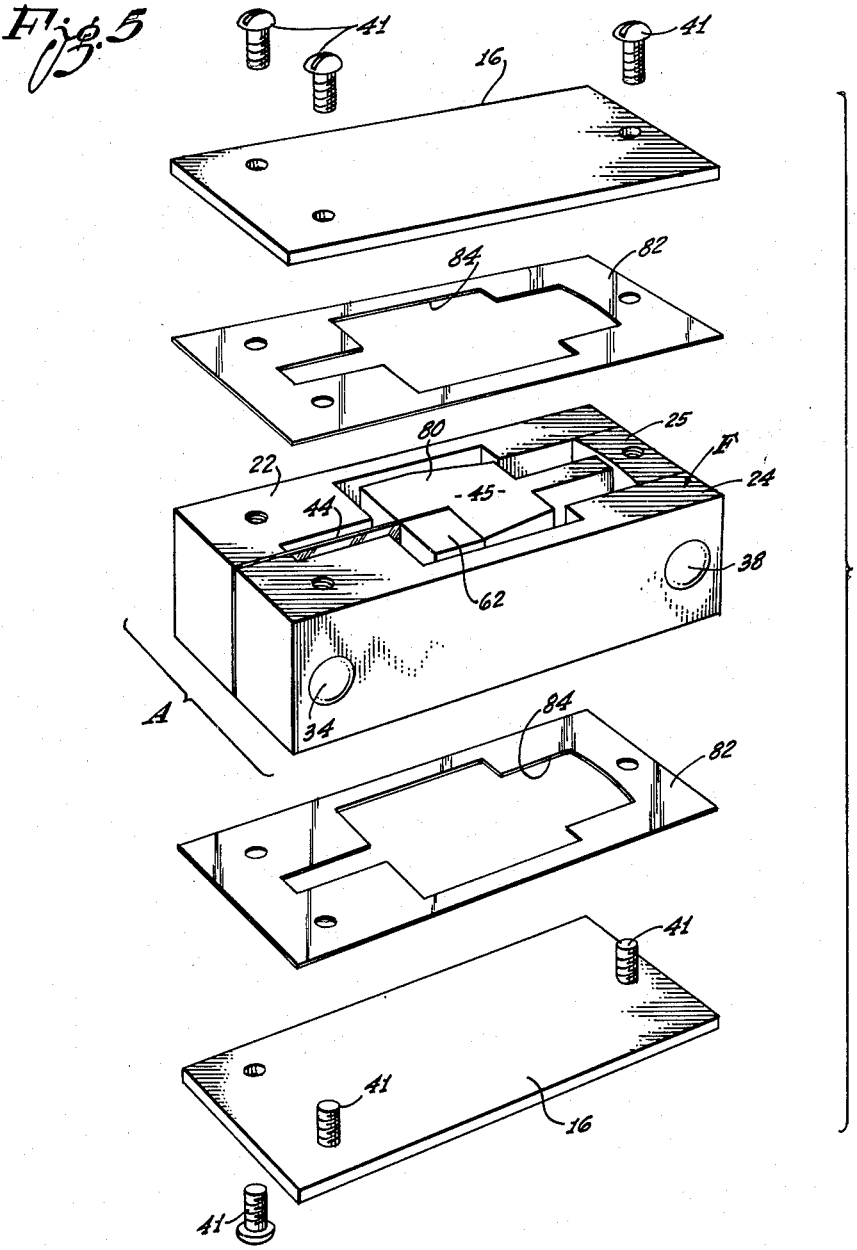
FIG. 5 is an exploded perspective view illustrating the preferred method of fabricaitng the accelerometer.

The selected embodiment of the invention has an outer housing 10 of boxlike configuration mounted on a base plate 12, which base plate provides side flange 14 with screw holes 15 for anchorage of the accelerometer. The housing 10 may be bonded to the base plate 12 in a sealed manner and for this purpose may, for example, be soldered to the base plate.

An inner housing in the form of a rectangular frame, generally designated F, equipped with a pair of opposite side plates 16, is mounted inside the housing 10 on the base plate 12. For this purpose, the rectangular frame F may be provided with tapped bores 18 as indicated in FIG. 3 to receive screws indicated at 20 in FIG. 2.

The rectangular frame F comprises an upper longitudinal metal block 22, a lower longitudinal metal block 24, and an end block 25. The three blocks constituting the rectangular frame F are held together by a pair of bolts 26 and 28. The two metal blocks 22 and 24 are provided with aligned countersunk bores 30 and 32, respectively, to receive the bolt 26 and a nut 34 on the end of the bolt. The two longitudinal blocks 22 and 24 have countersunk bores 35 and 36, respectively, to receive the bolt 28 and a nut 38 on the end of the bolt. The bolt 28 extends through a third bore 40 in the end block 25, the third bore being oversized to permit adjustment of the end block in the assembly of the frame. The two side plates 16 are secured to the three blocks by suitable screws 41.

As may be seen in FIG. 3, the rectangular frame F forms a chamber 42 to house a sensing assembly comprising a leaf spring 44 and a sensing mass, generally designated 45, that is mounted on the leaf spring. One end of the leaf spring 44 is fixed clamped between the two frame blocks 22 and 24, the leaf spring being apertured to clear the bolt 26.

The chamber 42 has a cross-sectional configuration in the plane of movement of the sensing assembly that corresponds in general to the cross-sectional configuration of the sensing assembly with adequate clearance for the sensing movement. Thus, the chamber 42 has a relatively narrow portion 42a in the region of the leaf spring 44, a larger portion 42b enclosing the major portion of the sensing mass 45 and, finally, a second end portion 42c which provides adequate clearance for the free swinging end of the sensing assembly.

The sensing mass 45 may be formed with an integral extension 46 which forms the free-swinging end of the sensing assembly, and a suitable pickup for signal-generating means may be associated with this free end. In this particular embodiment of the invention, the signaling means includes a potentiometer coil 48 that extends through an aperture 50 in the extension 46 with relatively close clearance, the potentiometer coil being fixedly mounted on the metal block 24. A suitable wiper 52 carried by the sensing mass extension 46 is positioned to traverse the potentiometer coil 48.

The potentiometer coil 48 is in a signaling circuit that includes a slender, flexible wire 54. The wire 54 extends from the wiper 52 through a small diameter bore 55 in the sensing mass 45, and further extends into a substantially larger bore 56 in the metal block 22. From the larger bore 56, the wire extends outward through an insulating bushing 58 in the outer housing 10. As indicated in FIG. 3, the wire 54 may be formed into a coil 60 inside the larger bore 56 to minimize the resistance of the wire to the flexure caused by the oscillations of the sensing assembly.

For the purpose of mounting the sensing mass 45 on the leaf spring 44, a portion of the sensing mass may be in the form of a removable block 62. A suitable bolt 64 connects the removable block 62 with the main portion of the sensing mass for the purpose of clamping the sensing mass on the leaf spring, the leaf spring being apertured to clear the bolt. In the construction shown, the sensing mass 45 and the removable block 62 are provided with aligned countersunk bores 65 and 66, respectively, to receive the bolt 64 and a nut 68.

The sensing mass 45 may be of tapered configuration as shown in FIG. 3 to provide clearance for oscillation in the chamber 42. A pair of set screws 70 and 72 may be mounted in corresponding bores in the two metal blocks 22 and 24 to serve as stops to limit the range of oscillation of the sensing mass. These set screws are adjustable from the exterior of the frame F.

Since the free end of the sensing assembly functions along an arcuate path and since minimum clearance is desired at the free end, the end block 25 of the rectangular frame is formed with an inner face 74 that is arcuate to conform to the path of the free end. This block is adjusted to provide close clearance at the end of the sensing assembly. The clearance between the sensing assembly and the adjacent chamber walls should be uniform and exceedingly small. In the initial embodiment of the invention, the clearance dimension is approximately .0015 inch on each side of the sensing assembly. The two opposite side faces 80 (FIG. 4) of the sensing mass 45 are accurately parallel to the side plates 16 at this close spacing.

This embodiment of the invention includes an auxiliary mass in the form of a solid metal cylinder 75 that is carried by the sensing assembly and is free to vibrate or oscillate relative to the sensing mass 45. In the construction shown in FIGS. 3 and 4, the sensing mass 45 is hollow to form a chamber for the auxiliary mass 75. For this purpose, the sensing mass is formed with a relatively large transverse bore 76 that extends all the way through the sensing mass, the bore being slightly larger than the auxiliary mass. The opposite ends of this bore are closed and sealed by thin plugs 78. Preferably, the bore 76 contains a suitable liquid 82 to damp the movements of the auxiliary mass relative to the sensing mass. The auxiliary mass 75 may be a sintered metal body composed largely of tungsten carbide, and the damping liquid 82 may be a suitable silicone.

The manner in which the selected embodiment of the invention functions for its purpose may be readily understood from the foregoing description. It is apparent that the sensing axis is along the arc described by the movements of the sensing mass and may be considered as a chord of the arc. When the sensing mass 45 responds to an acceleration having a component along the sensing axis, the sensing assembly comprising the leaf spring 44 and the sensing mass 45 functions in effect as a piston to cause displacement flow through a restricted clearance space, the clearance space functioning as a damping orifice for the displacement flow. Since the flat leaf spring effectively confines the arcuate movements of the sensing assembly to movements in a plane, there is no frictional contact between the sensing assembly and the side walls of the chamber in which it functions.

It is to be noted that in a conventional piston the center of gravity of the piston and the center of the fluid pressure against the piston coincide. In the present embodiment of the invention, the sensing assembly is so constructed that the center of pressure is aligned with the center of gravity of the sensing assembly. Thus, the resistance of the gaseous fluid to the piston-like movements of the sensing assembly is centered with respect to the center of gravity to avoid any tendency for the fluid pressure to apply a turning moment to the sensing assembly.

The gaseous damping fluid is air in this particular embodiment of the invention but other gaseous fluids may be confined in the accelerometer chamber 42 and the confined gaseous fluid may be under higher than atmospheric pressure, if so desired.

As heretofore noted, the two longitudinal side edges and the swinging end of the sensing mass cooperate with the surrounding walls of the chamber 42 to form a U-shaped clearance space or slot which functions as a damping orifice for displacement flow of the damping gaseous fluid. A problem arises since if the whole extent of this U-shaped clearance space were effective to function in the manner of an orifice in a thin plate the total orifice area would be too large for restriction of the displacement flow to the degree necessary for the desired damping action.

This problem is solved by forming the sensing mass 45 with the extensive parallel side surfaces 80 so that any displacement flow of the gaseous fluid past the sensing mass must travel along relatively long paths. Since the resistance to displacement flow along these paths varies with the square of the length of the paths, it may be readily appreciated that the sensing mass makes the immediately adjacent clearance space on the opposite sides of the mass substantially ineffective for displacement flow. The resistance to displacement flow between the opposite parallel side faces of the sensing mass and the adjacent parallel faces of the side plates 16 is so great that the sensing mass diverts nearly all of the displacement flow to the two parallel clearance spaces between the exposed side edges of the leaf spring 44 and the adjacent side plates 16. The extension 46 of the sensing mass 45 provides paths of possible displacement somewhat shorter than the paths provided by the main portion of the sensing mass, but these shorter paths are long enough to tend to divert the displacement flow to the opposite chamber portion 42a, and especially so since the extension 46 swings through its arc at substantially higher velocity than the main portion of the sensing mass.

With rising temperature, the thermal expansion of the leaf spring 44 causes the width of the leaf spring to increase at a lesser rate than the width dimension of the chamber 42, i.e., the dimension between the two side plates 16. Thus, with rising temperature, the clearance space at the exposed opposite side edges of the leaf spring decreases for correspondingly less restriction of the displacement flow to compensate for the increasing viscosity of the gaseous fluid.

It is to be noted that the area of the sensing mass which acts on the confined gaseous fluid is relatively large, whereas the actual volume of the confined gaseous fluid is relatively low. This relationship desirably minimizes the effect of the compressibility of the gaseous damping fluid. An important factor in minimizing the volume of the confined gaseous fluid is that, as heretofore noted, the configuration of the chamber 42 in the plane of the movement of the sensing assembly conforms generally to the cross-sectional configuration of the sensing assembly.

In the relatively low range of frequency of the accelerations that the described accelerometer is designed to sense, the auxiliary mass 75 moves with the sensing mass 45 and behaves in the manner of an integral part of the sensing mass. At the critical higher frequency range at which accelerations would ordinarily undulate the sensing assembly in a destructive manner, the auxiliary sensing mass 75 responds by oscillating relative to the sensing mass 45. In this manner, the auxiliary mass absorbs the high frequency energy to make the sensing mass immune to the high frequency energy.

The exploded view in FIG. 5 illustrates the preferred method of fabricating the described accelerometer. In this fabrication procedure, the assembly that is generally designated A in FIG. 5 is first fabricated. This assembly consists of the previously described frame F with the leaf spring 44 assembled to the frame, and with the sensing mass 45 mounted on the leaf spring. The width of the leaf spring 44 and the width of the sensing mass 45 are at least as great as the corresponding width or thickness of the frame F. This assembly A is subjected to an accurate grinding operation which removes material not only from the two opposite side faces of the frame F but, also, simultaneously from the two opposite side faces of the sensing mass 45 and the two side edges of the leaf spring 44. At the end of this grinding operation the assembly A has two accurately ground side faces in precisely parallel planes, the parallel planes being perpendicular to the leaf spring 44. The inner surfaces of the two side plates 16 are accurate planar surfaces and may also be formed by grinding if desired.

The next step is to provide a pair of shims 82 of the thickness that is desired for the clearance between the opposite sides of the sensing assembly and the adjacent side plates 16. In the present embodiment of the invention, these shims are .0015 inch thick. The shims are cut out in the regions adjacent the path of movement of the sensing assembly. In the construction shown, each of the shims is cut away to provide a large opening 84 that conforms to the cross-sectional configuration of the accelerometer chamber 42. When the side plates 16 are assembled to the opposite sides of assembly A with the two shims 82 interposed between the two side plates 16 and the frame F, the resulting configuration and dimensions of the accelerometer chamber 42 provide accurately dimensioned and uniform clearance space on the two sides of the sensing assembly.

My description in specific detail of the selected embodiment of the invention will suggest various changes, substitutions and other departures from my disclosure, within the spirit and scope of the appended claims.

I claim:

1. In an accelerometer for detecting accelerations of relatively low frequency, the combination of:
    a chamber containing a gaseous fluid and having parallel opposite side walls,
    a cantilever leaf spring anchored by one end portion in said chamber,
    a relatively large sensing mass mounted on the free end of said cantilever spring and having a configuration similar to that of the chamber to form restricted clearance spaces between said mass and the side walls of the chamber so that movement of said mass will cause the fluid to flow through said spaces,
    said sensing mass being spaced substantially from said anchored end portion of the cantilever leaf spring whereby relatively high frequency accelerations tend to cause a wave-like motion of the cantilever leaf spring with corresponding rotary oscillation of the sensing mass, and
    a single relatively small auxiliary body confined loosely in a cavity in said sensing mass to dampen high frequency rotary oscillations of the sensing mass,
    the center of pressure of the gaseous fluid on the sensing assembly being in substantial alignment with the path of the center of gravity of the sensing assembly.

2. In an accelerometer, the combination of:
    a chamber containing a gaseous fluid and having parallel opposite side walls,
    a sensing assembly comprising a leaf spring and a sensing mass mounted thereon, said leaf spring extending in width across said chamber perpendicularly of said side walls with one end of the leaf spring anchored at the end of the chamber and with the other end yieldingly supporting the sensing mass and confining the movement of the sensing mass to a path parallel to the side walls of the chamber, said sensing assembly spanning said chamber in length and width at close spacing from the chamber walls whereby the gaseous fluid is displaced around the sensing assembly for damping the acceleration-responsive movements of the sensing assembly, said sensing mass having extensive opposite side surfaces parallel with said side walls, respectively, of the chamber at close spacing from the side walls to result in high frictional resistance to displacement flow of the gaseous fluid past the sides of the sensing mass with consequent diversion of the major portion of the displacement flow from the region of the sensing mass to the side edges of the leaf spring, the cross-sectional configuration of the chamber in a plane perpendicular to the leaf spring conforming generally to the cross-sectional configuration of the sensing assembly to provide a high ratio between the area of the sensing assembly that acts on the gaseous fluid and the volume of the gaseous fluid.

3. In an accelerometer, the combination of:

a chamber containing a gaseous fluid and having parallel opposite side walls, a sensing assembly comprising a leaf spring and a sensing mass mounted thereon, said leaf spring extending in width across said chamber perpendicularly of said side walls with one end of the leaf spring anchored at the end of the chamber and with the other end yieldingly supporting the sensing mass and confining the movement of the sensing mass to a path parallel to the side walls of the chamber, said sensing assembly spanning said chamber in length and width at close spacing from the chamber walls whereby the gaseous fluid is displaced around the sensing assembly for damping the acceleration-responsive movements of the sensing assembly, said sensing mass having extensive opposite side surfaces parallel with said side walls, respectively, of the chamber at close spacing from the side walls to result in high frictional resistance to displacement flow of the gaseous fluid past the sides of the sensing mass with consequent diversion of the major portion of the displacement flow from the region of the sensing mass to the side edges of the leaf spring.

4. In an accelerometer, the combination of:

a chamber containing a gaseous fluid and having parallel opposite side walls.

a sensing assembly comprising a leaf spring and a sensing mass mounted thereon, said leaf spring extending in width across said chamber perpendicularly of said side walls with one end of the leaf spring anchored at the end of the chamber and with the other end yieldingly supporting the sensing mass and confining the movement of the sensing mass to a path parallel to the side walls of the chamber, said sensing assembly spanning said chamber in length and width at close spacing from the chamber walls whereby the gaseous fluid is displaced around the sensing assembly for damping the acceleration-responsive movements of the sensing assembly, said sensing mass having extensive opposite side surfaces parallel with said side walls, respectively, of the chamber at close spacing from the side walls to result in high frictional resistance to displacement flow of the gaseous fluid past the sides of the sensing mass with consequent diversion of the major portion of the displacement flow from the region of the sensing mass to the side edges of the leaf spring, said chamber and at least a portion of said sensing assembly being made of materials having different coefficients of thermal expansion to cause the close spacing between the sensing assembly and the chamber walls to widen in response to rising temperature to compensate for rising of the viscosity of the gaseous fluid with rising temperature.

5. In an accelerometer, the combination of:

a chamber containing a gaseous fluid and having parallel opposite side walls, a sensing assembly comprising a leaf spring and a sensing mass mounted thereon, said leaf spring extending in width across said chamber perpendicularly of said side walls with one end of the leaf spring anchored at the end of the chamber and with the other end yieldingly supporting the sensing mass and confining the movement of the sensing mass to a path parallel to the side walls of the chamber, said sensing assembly spanning said chamber in length and width at close spacing from the chamber walls whereby the gaseous fluid is displaced around the sensing assembly for damping the acceleration-responsive movements of the sensing assembly, said sensing mass having extensive opposite side surfaces parallel with said side walls, respectively, of the chamber at close spacing from the side walls to result in high frictional resistance to displacement flow of the gaseous fluid past the sides of the sensing mass with consequent diversion of the major portion of the displacement flow from the region of the sensing mass to the side edges of the leaf spring, said sensing mass being mounted on the leaf spring at a substantial distance from the anchored portion of the leaf spring whereby relatively high frequency accelerations tend to cause a wavelike motion of the sensing mass and including a single relatively small auxiliary body in a cavity in said sensing mass to damp rotary oscillatory response of the sensing body to relatively high frequency vibrations.

6. The combination of claim 5, wherein said cavity contains a fluid to damp the movements of the auxiliary mass relative to the sensing mass.

7. In an accelerometer for measuring accelerations of relatively low frequency, the combination of:

a chamber containing a gaseous fluid and having parallel opposite side walls, a sensing assembly comprising a cantilever leaf spring and a sensing mass mounted thereon, said leaf spring extending in width across said chamber perpendicularly of said side walls with one end portion of the leaf spring anchored to the chamber and with the other end yieldingly supporting the sensing mass and confining the movement of the sensing mass to a curved path parallel to the side walls of the chamber, said sensing mass being spaced substantially from said anchored end portion of the leaf spring with an intermediate portion of substantial length of the leaf spring free to flex, whereby relatively high frequency oscillations tend to cause a wavelike motion of the cantilever leaf spring with corresponding rotary oscillation of the sensing mass about an axis passing through the sensing mass, said sensing assembly spanning said chamber in length, both said sensing mass and said intermediate portion of the spring spanning the chamber in width at close spacing from the chamber walls, the end wall of the chamber adjacent the free end of the sensing assembly being curved in accord with the curved path of the free end of the sensing assembly and being at close spacing from the end of the sensing assembly whereby the gaseous fluid is displaced around the two sides and the free end of the sensing assembly through narrow clearance spaces for damping the acceleration-responsive movements of the sensing mass, a single relatively small auxiliary body confined loosely in a cavity in said sensing mass to dampen high frequency rotary oscillations of the sensing mass, and a fluid in said cavity to damp movements of the auxiliary body relative to the cavity.

8. In an accelerometer, the combination of:

a chamber containing a gaseous fluid and having parallel opposite side walls, a sensing assembly comprising a cantilever leaf spring and a sensing means mounted thereon, said leaf spring extending in width across said chamber perpendicularly of said side walls with one end portion of the leaf spring anchored to the chamber and with the other end yieldingly supporting the sensing mass and confining the movement of the sensing mass to a curved path parallel to the side walls of the chamber, said sensing mass being spaced substantially from said anchored end portion of the leaf spring with an intermediate portion of substantial length of the leaf spring free to flex, said sensing assembly spanning said chamber in length, both said sensing mass and said intermediate portion of the spring spanning the chamber in width at close spacing from the chamber walls, the end wall of the chamber adjacent the free end of the sensing assembly being curved in accord with the curved path of the free end of the sensing assembly and being at close spacing from the end of the sensing assembly whereby the gaseous fluid is displaced around the side and the free end of the sensing assembly through narrow clearance spaces for damping the acceleration-responsive movements of the sensing mass, the cross-sectional configuration of the chamber in a plane perpendicular to the leaf spring longitudinally thereof conforming generally to the cross-sectional configuration of the sensing assembly to provide a high ratio between the area of the sensing assembly that acts on the gaseous fluid and the volume of the gaseous fluid.

9. In an accelerometer, the combination of:

a chamber containing a gaseous fluid and having parallel opposite side walls, a sensing assembly comprising a cantilever leaf spring and a sensing means mounted thereon, said leaf spring extending in width across said chamber perpendicularly of said side walls with one end portion of the leaf spring anchored to the chamber and width the other end yieldingly supporting the sensing mass and confining the movement of the sensing mass to a curved path parallel to the side walls of the chamber, said sensing mass being spaced substantially from said anchored end portion of the leaf spring with an intermediate portion of substantial length of the leaf spring free to flex, said sensing assembly spanning said chamber in length, both said sensing mass and said intermediate portion of the spring spanning the chamber in width at close spacing from the chamber walls, the end wall of the chamber adjacent the free end of the sensing assembly being curved in accord with the curved path of the free end of the sensing assembly and being at close spacing from the end of the sensing assembly whereby the gaseous fluid is displaced around the side and the free end of the sensing assembly through narrow clearance spaces for damping the acceleration-responsive movements of the sensing mass, the cross-sectional configuration of the chamber in a plane perpendicular to the leaf spring longitudinally thereof conforming generally to the cross-sectional configuration of the sensing assembly to provide a high ratio between the area of the sensing assembly that acts on the gaseous fluid and the volume of the gaseous fluid, the center of pressure of the gaseous fluid on the sensing assembly being substantially in alignment with the path of the center of gravity of the sensing assembly,

References Cited in the file of this patent

UNITED STATES PATENTS

| | | |
|---|---|---|
| 1,407,320 | Bouche | Feb. 21, 1922 |
| 2,040,152 | Pennington | May 12, 1936 |
| 2,108,695 | Tapley | Feb. 15, 1938 |
| 2,302,670 | Buchanan | Nov. 24, 1942 |
| 2,332,994 | Draper | Oct. 26, 1943 |
| 2,349,187 | Meyer | May 16, 1944 |
| 2,453,548 | Statham | Nov. 9, 1948 |
| 2,552,722 | King | May 15, 1951 |
| 2,598,552 | Jansen | May 27, 1952 |
| 2,643,869 | Clark | June 30, 1953 |
| 2,736,393 | O'Connor | Feb. 28, 1956 |
| 2,801,097 | Adamson | July 30, 1957 |
| 2,816,748 | Woestemeyer | Dec. 17, 1957 |
| 2,822,161 | Tikanen | Feb. 4, 1958 |
| 2,907,560 | Stedman | Oct. 6, 1959 |
| 3,078,724 | Gindes et al. | Feb. 26, 1963 |

FOREIGN PATENTS

| | | |
|---|---|---|
| 764,388 | Great Britain | Dec. 28, 1956 |